United States Patent

Nageno et al.

[11] Patent Number: 5,949,896
[45] Date of Patent: Sep. 7, 1999

[54] EARPHONE

[75] Inventors: Koji Nageno, Tokyo; Katsunori Murozaki, Chiba; Naotaka Tsunoda, Tokyo, all of Japan

[73] Assignee: Sony Corporation, Tokyo, Japan

[21] Appl. No.: 08/910,663

[22] Filed: Aug. 13, 1997

[30] Foreign Application Priority Data

Aug. 19, 1996 [JP] Japan .................................. 8-237254

[51] Int. Cl.$^6$ .................................................. H04R 25/00
[52] U.S. Cl. ............................................. 381/328; 381/380
[58] Field of Search .................................... 381/328, 309, 381/74, 373, 370, 380

[56] References Cited

U.S. PATENT DOCUMENTS 4,878,560  11/1989  Scott ........................................ 381/380

FOREIGN PATENT DOCUMENTS 02044899  2/1990  Japan ................................ H04R 1/10
08172691  7/1996  Japan ................................ H04R 1/10

Primary Examiner—Vivian Chang
Attorney, Agent, or Firm—Jay H. Maioli

[57] ABSTRACT

An earphone with an improved frequency response includes an electroacoustic transducer for converting an audio signal to an acoustic sound and an ear piece. The ear piece is provided on a sound emanating side of the electroacoustic transducer to introduce sound produced by the electroacoustic transducer to the external auditory meatus. An opening for opening an air chamber formed on the sound emanating side of the electroacoustic transducer to the outside by the ear piece is provided in the ear piece and a ventilation resistant material is provided to cover the opening.

5 Claims, 9 Drawing Sheets

EARPHONE

BACKGROUND OF THE INVENTION

This invention relates to an inner ear type electroacoustic transducer apparatus or an earphone.

For example an inner ear type electroacoustic transducer apparatus or an earphone shown in FIGS. 8–10 has been already proposed. In this case, a left earphone 1 is shown. With reference to FIG. 10, the ear phone 1 will be explained in detail. In FIG. 10, reference numeral 10 denotes an electroacoustic transducer for converting an audio signal to sound, which is formed in, for example, a moving coil type. Reference numeral 11 denotes a diaphragm and a bobbin 12 around which a voice coil is wound is integrally attached to this diaphragm 11. Then, this voice coil or the bobbin 12 is inserted into a magnetic gap 14 of a magnetic circuit 13. On a sound emanating side of the transducer 10 or front side is provided a protecting plate 2 which opposes the diaphragm 11 and is formed by working a metal plate of substantially the same size as the diaphragm 11. This protecting plate 2 has a plurality of through-holes 21 through which sound waves emitted from the diaphragm 11 are made to pass.

Further, a front side of this protecting plate 2 is covered with an ear piece 3. This ear piece 3 is a portion mounted within a listener's ear or auricle when the earphone 1 is used. To this end, the ear piece 3 has a protruding portion 30 in which a portion corresponding to an entrance of the external auditory meatus is protruded is formed so as to have a substantially the same thickness in any portions and which is made of rubber or plastic material having an appropriate elasticity. Then, a tip end of the protruding portion 30 has a plurality of sound emanating through-holes 31.

A rear face of the element or transducer 10 is covered with a cover 4 formed of plastic material. In this case, an air chamber 41 of a predetermined volume is formed in the back of the element 10 within the cover 4.

The element 10 is connected to an earphone cord 5 through an introducing portion 40 elongated integrally with the cover 4 at an lower part thereof.

The air chamber 41 is open to the outside through a passage hole 42 provided in the introducing portion 40 and thus an acoustic circuit having a predetermined damping resistance is formed in the rear part of the transducer 10.

FIG. 9 shows a state in which the earphone 1 is mounted within an auricle E. With the protruding portion 30 engaged in the external auditory meatus of the auricle E of the left ear, the earphone 1 is worn within a cavum concha F and the introducing portion 40 is introduced to the outside through an inner-tragus notch I between a tragus G and an anti-tragus H. Thus, the electroacoustic transducer 10 or the diaphragm 11 is driven by an audio signal supplied through the cord 5 and a sound is introduced to the external auditory meatus through the sound emanating through-holes 31, so that a man wearing the earphone 1 can hear the sound.

In this case, the cover 4 has provided with a plurality of through-holes 43, which are closed by, for example, acoustic resistant material 44 such as an urethane. Additionally, an acoustic resistant material 16 such as an urethane or the like is charged into a through-hole 15 formed through the center of a plate, a magnet and a yoke constituting the magnetic circuit 13.

However, when a frequency characteristic of the aforementioned earphone 1 is measured, as is indicated for example, by a curve X in FIG. 4, a low acoustic range results thereby producing indistinct sounds.

This reason will be explained by an acoustic equivalent circuit as follows. That is, in the earphone 1, an air chamber 32 is formed in front of the element 10 by the ear piece 3 and this air chamber 32 is substantially closed. Thus, as evident in an acoustic equivalent circuit shown in FIG. 7, the air chamber 32 acts as an acoustic load and is capacitive (capacity CL). Thus, in the low frequency acoustic range, the capacitive control is performed on the damping side so that a substantially flat frequency characteristic is presented. However, in a high frequency acoustic range, an inertial control results, therefore the response diminishes. That is, there is provided a frequency characteristic in which a drop in an acoustic range over 1.5 kHz is conceivable.

Thus, an earphone 1 having a small hole 33 in an ear piece 3 to reduce a level in the low acoustic range as shown in FIG. 11 was produced and its characteristic was measured. FIG. 11 is a sectional view corresponding to FIG. 10 and the same reference numerals are attached to the same components and a description thereof in detail is omitted.

Consequently, an acoustic equivalent circuit thereof is expressed by a parallel circuit formed of the capacity CL of the air chamber 32 and an inertial load ML of the small hole 33 as an acoustic load as shown in FIG. 6. Thus, an inertial load is provided in the low acoustic range, so that as shown by a curve Y in FIG. 4 indicating a result of measurement of frequency characteristic, the level in the low acoustic range is damped steeply thereby eliminating an elongation in a low-pitched sound. Additionally, there occurs a resonance in a middle acoustic range of approximately 1.5 kHz due to the capacitive CL and inertial ML loads. As a result, a sound having a peculiar feature was produced, and therefore it was found that a problem in terms of acoustic quality was unavoidable.

SUMMARY OF THE INVENTION

Accordingly, the present invention has been proposed to solve the aforementioned problem and an object of the present invention is to propose an earphone capable of providing an improved frequency characteristic.

According to the present invention, there is provided an earphone comprising an electroacoustic transducer for converting an audio signal to an acoustic sound and an ear piece which is provided on a sound emanating side of the electroacoustic transducer for introducing a sound produced by the electroacoustic transducer to the external auditory meatus when it is worn in an auricle, wherein an opening for opening an air chamber formed on the sound emanating side of the electroacoustic transducer by the ear piece is provided in the ear piece and a ventilation resistant material is provided in the opening.

As a result, it is possible to suppress an excess response in the low acoustic range and eliminate the resonance in the middle acoustic range thereby ensuring a plain frequency characteristic.

DETAILED DESCRIPTION OF THE PREFERRED EMBODIMENT

Figure 1:
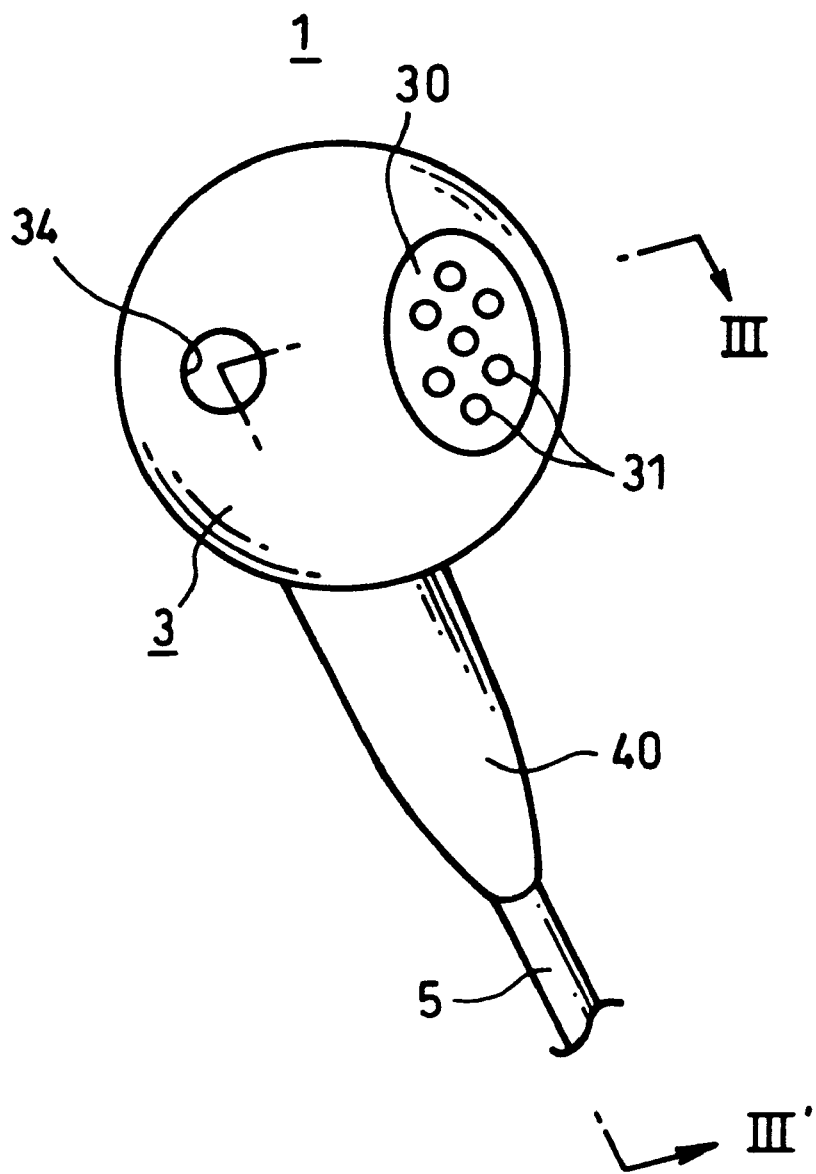
FIG. 1 is a front view of an earphone according to an embodiment of the present invention.
Figure 2:
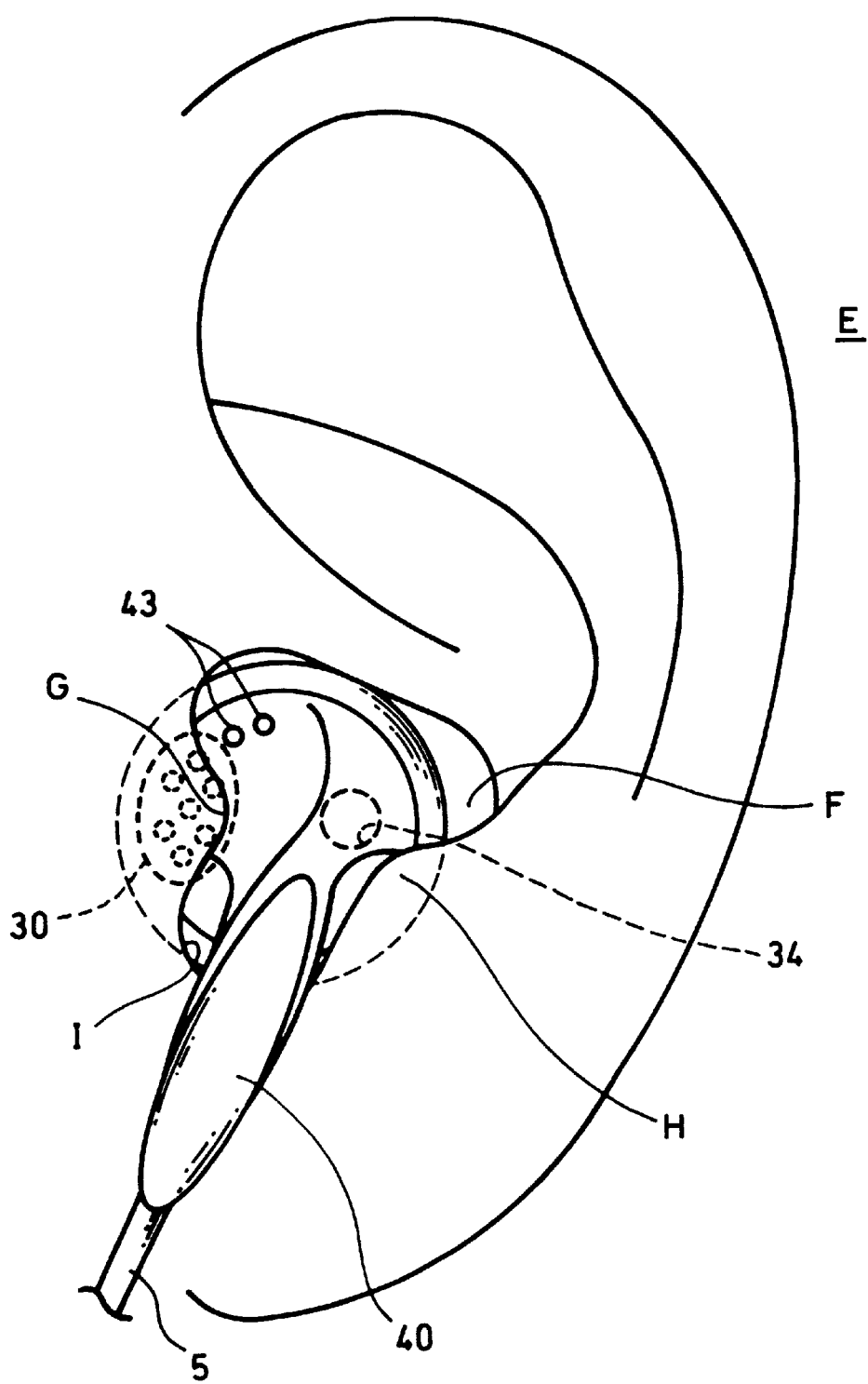
FIG. 2 is a front view of a state in which the earphone according to the embodiment of the present invention is worn within an ear.
Figure 3:
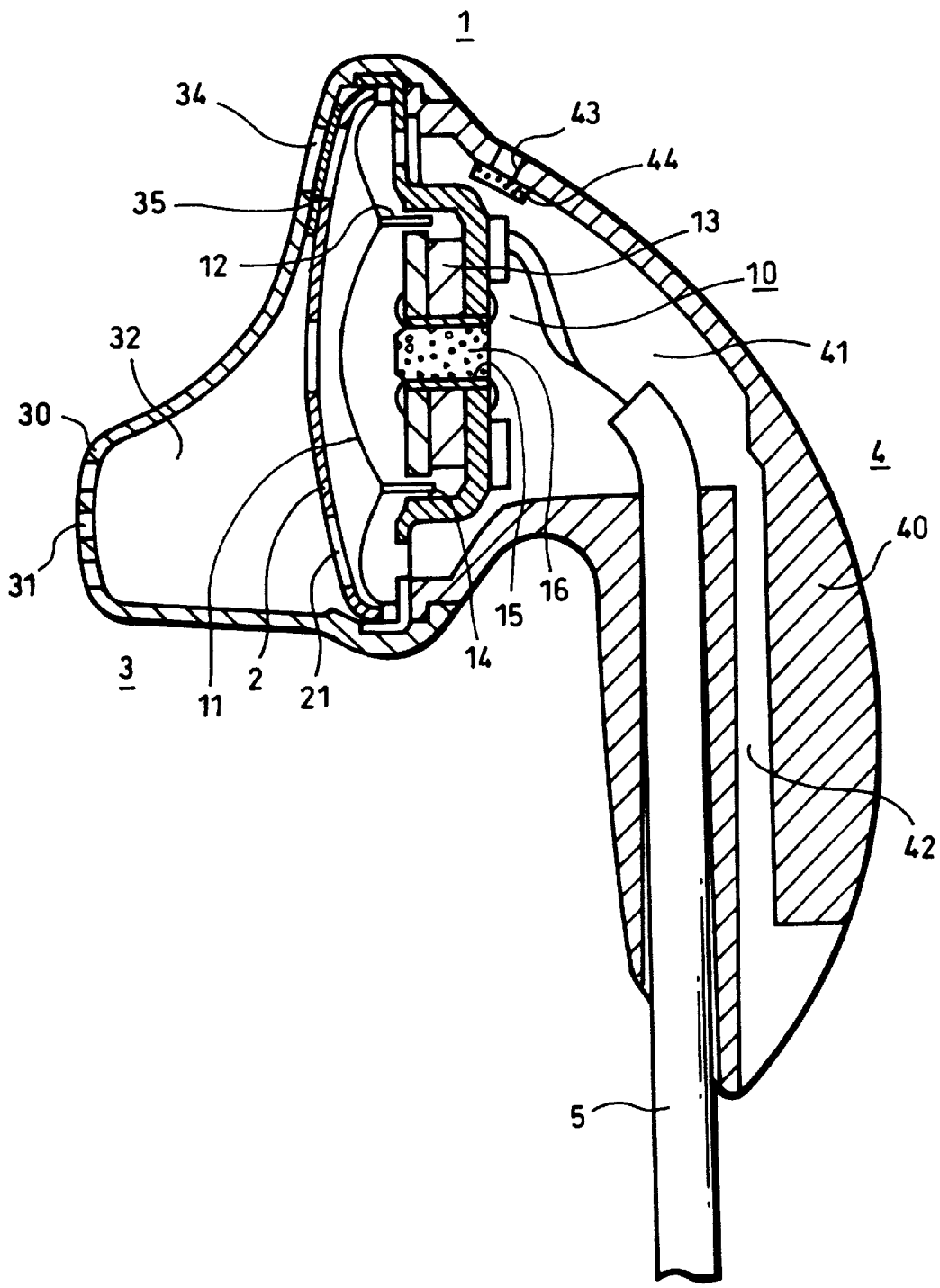
FIG. 3 is an enlarged sectional view of the earphone according to the embodiment of the present invention, taken along the lines III–III' in FIG. 1.
Figure 8:
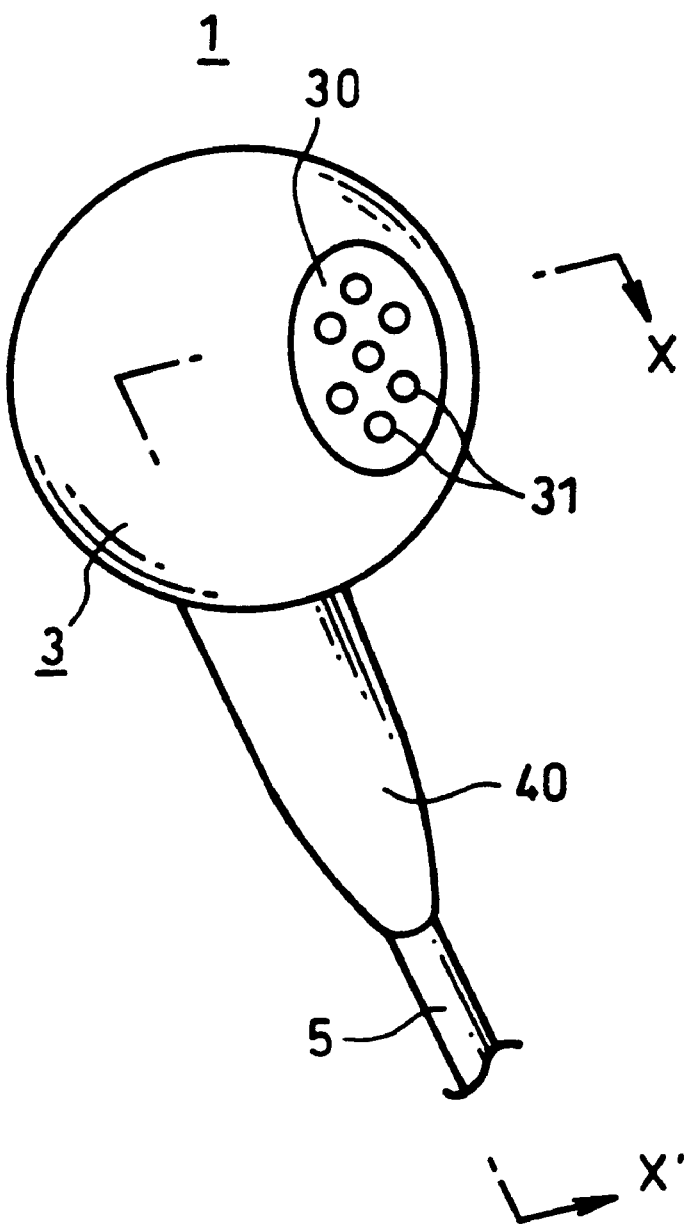
FIG. 8 is a front view of the conventional earphone.
Figure 9:
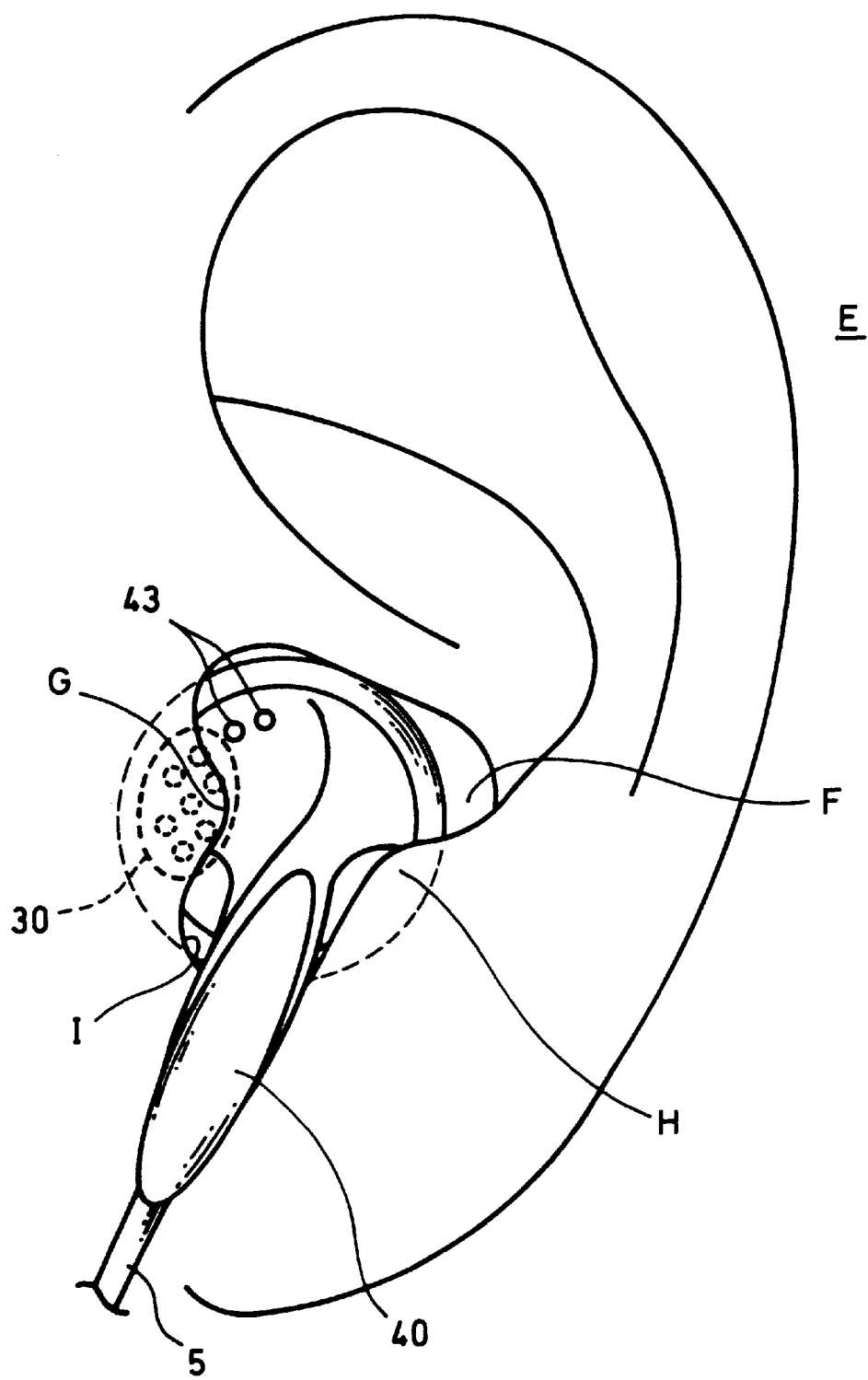
FIG. 9 is a front view of a state in which the conventional earphone is worn within the ear.
Figure 10:
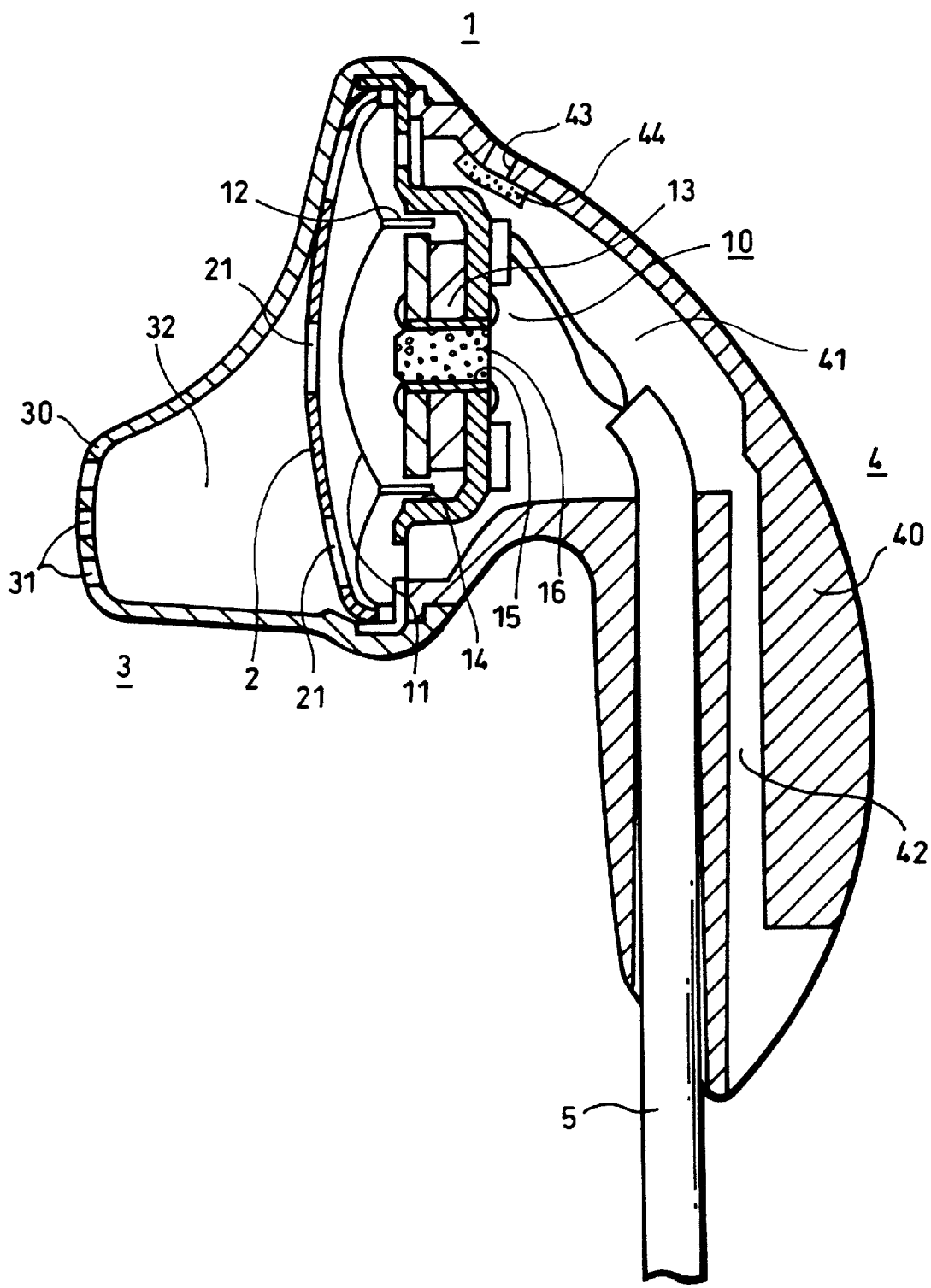
FIG. 10 is an enlarged sectional view of the conventional earphone, taken along the lines X–X' in FIG. 8.
Figure 11:
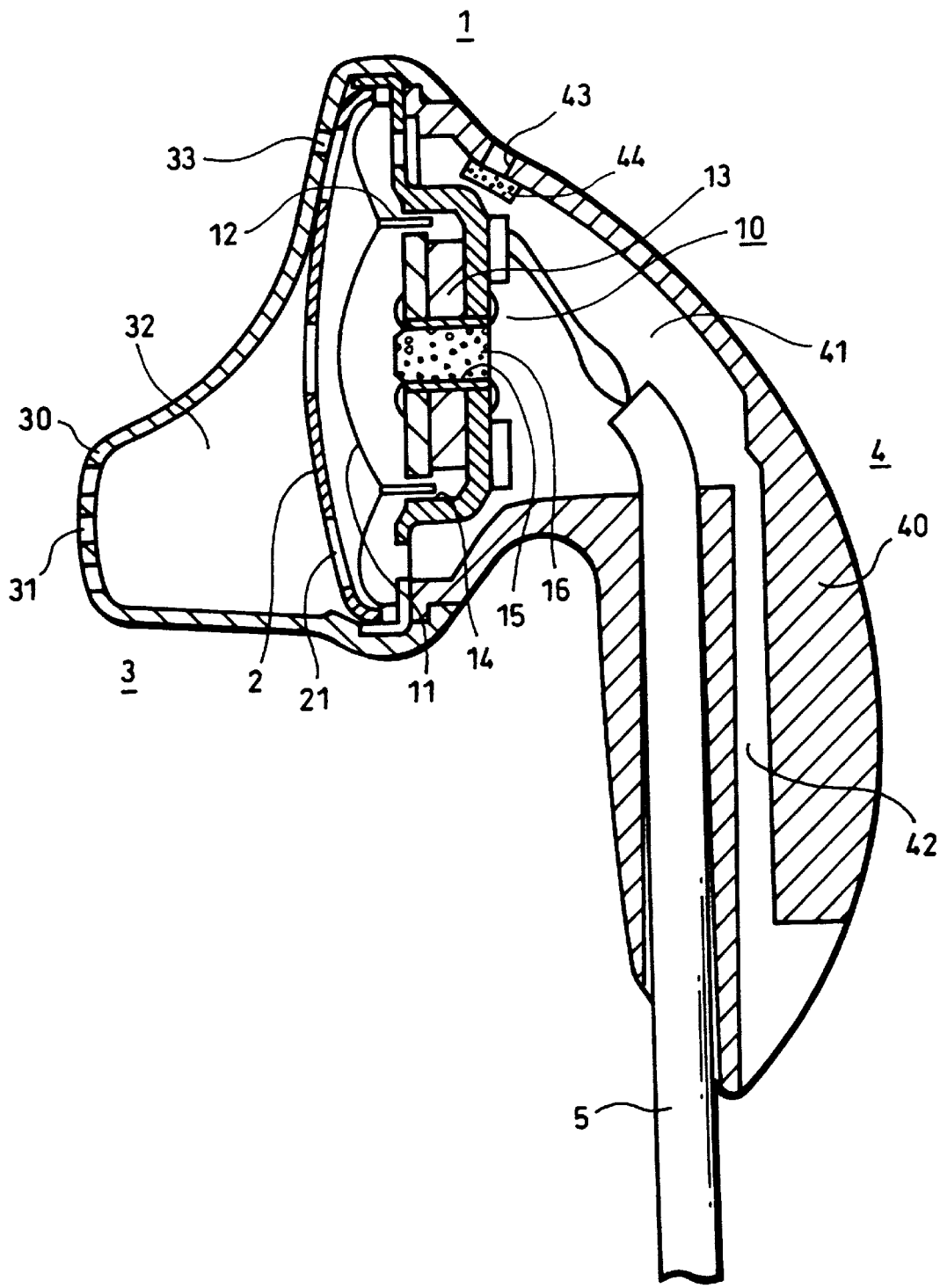
FIG. 11 is an enlarged sectional view corresponding to FIG. 10 for use in explanation of the earphone of the present invention.

FIGS. 1 to 3 are an embodiment of an earphone 1 according to the present invention, which has a construction corresponding to FIGS. 8–10. Meanwhile, FIG. 1 corresponds to FIG. 8, FIG. 2 corresponds to FIG. 9, and FIG. 3 corresponds to FIG. 10, respectively. Thus, the same reference numerals are attached to the same components and a description thereof in detail is omitted.

According to the present invention, an opening 34 of a predetermined size is formed through the ear piece 3 and as shown in FIG. 3, for example, a nonwoven fabric 35 is attached as a ventilation resistance to an internal surface of the ear piece 3 so as to close the opening 34.

In this case, the opening 34 is provided at a position opposing the protruding portion 30 with respect to a central portion of the ear piece 3 as a center as shown in FIG. 1, and when the earphone 1 is worn in the auricle E such that the protruding portion 30 engages the ear hole or the external auditory meatus, the opening 34 is located in the cavum concha F such that it is close to the skin of the cavum concha F.

Figure 5:
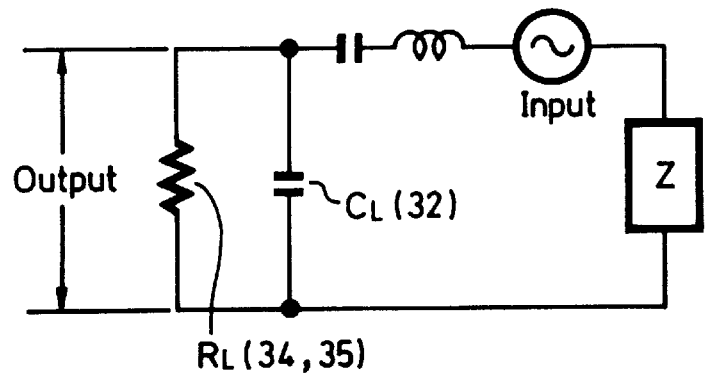
FIG. 5 is an acoustic equivalent circuit of the earphone of the present invention.
Figure 6:
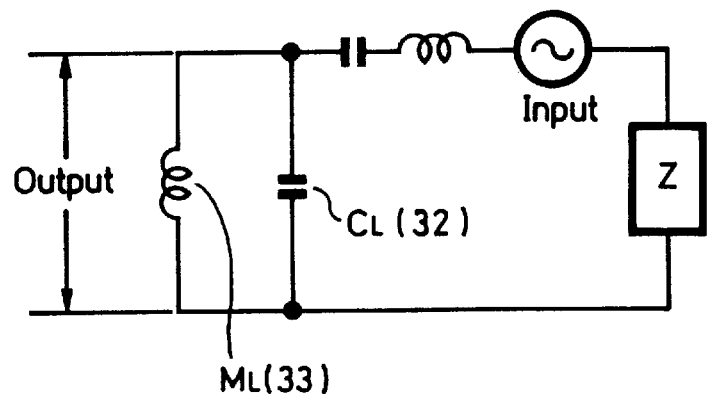
FIG. 6 is an acoustic equivalent circuit for use in explanation of the earphone of the present invention.
Figure 7:
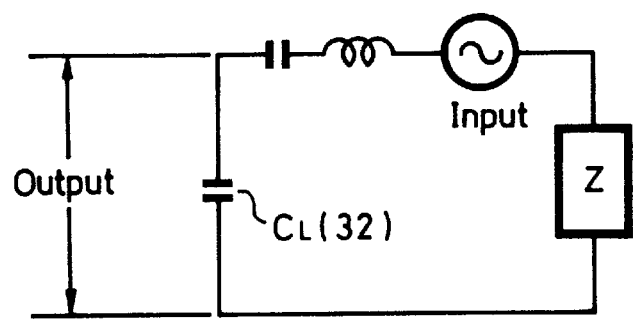
FIG. 7 is an acoustic equivalent circuit of a conventional earphone.

According to this construction, the air chamber 32 is open to the outside through the opening 34 and the nonwoven fabric 35, and at the same time, a ventilation resistance is presented by the nonwoven fabric 35. Therefore, an acoustic equivalent circuit of the earphone 1 becomes as shown in FIG. 5, in which an acoustic load is presented by a parallel circuit comprising the volume CL by the air chamber 32 and the resistance RL of the nonwoven fabric 35 of the opening 34. Accordingly, level is attenuated in a low acoustic range and a middle acoustic range and at the same time, it is attenuated gradually toward the low acoustic range. Further, a resonance in the middle acoustic range is eliminated by the opening 34.

Figure 4:
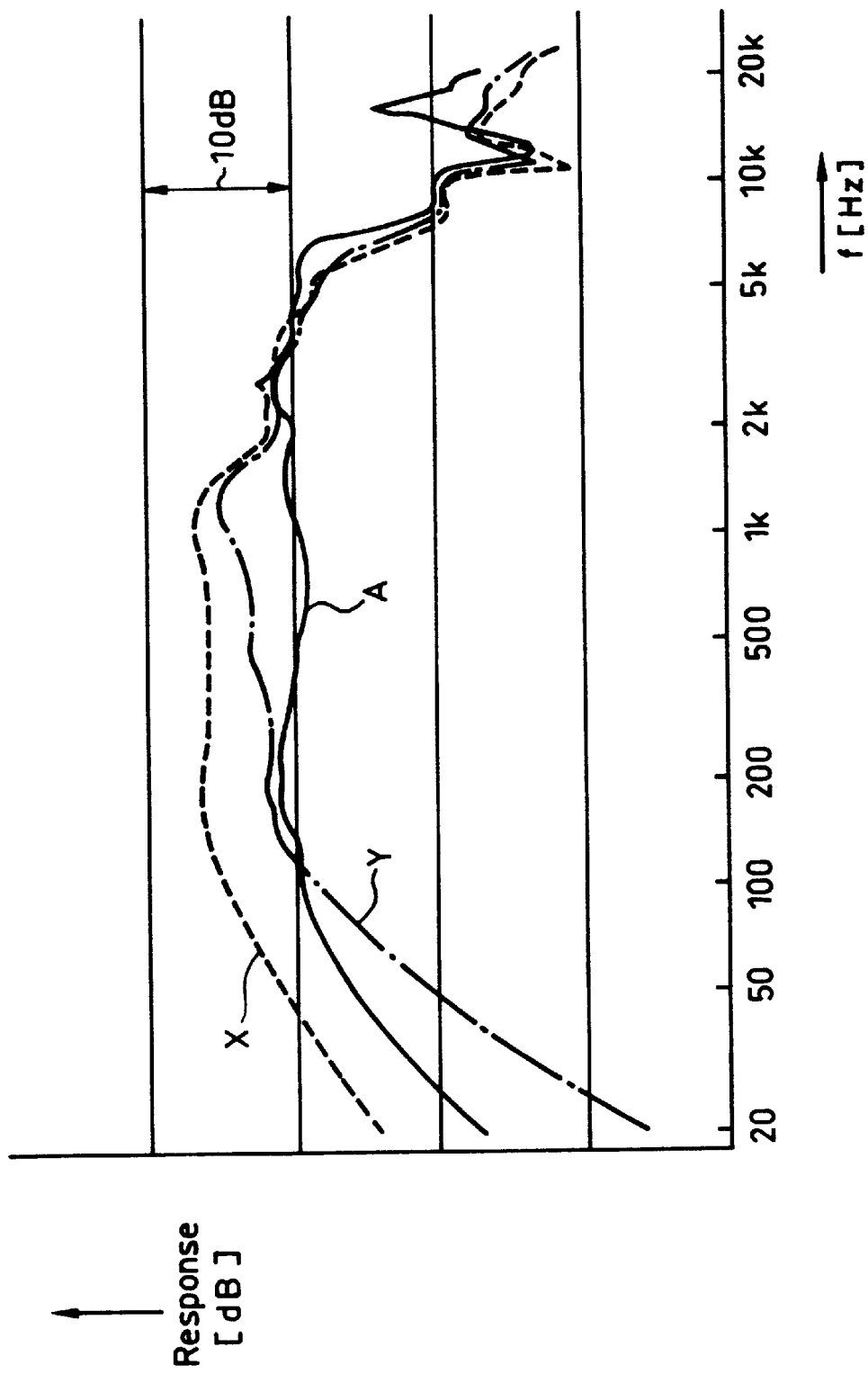
FIG. 4 is a diagram showing a relationship between a frequency and a response of the earphone.

Referring to FIG. 4, a curve A indicates a result of measurement of a frequency characteristic of the earphone 1 according to the present invention. As evident from this measured result, its low acoustic range is not excessive and its characteristic is extended up to a lower frequency. Additionally, there is no resonance in the middle range so that the characteristic is flat. The same characteristic was obtained by an urethane product as the resistant material and so on in place of the nonwoven fabric 35.

Although in the above embodiment, only one opening 34 is provided as shown in FIG. 1, it is permissible to provide a plurality of the openings so as to obtain a desired characteristic if necessary.

In the above embodiment, the ear piece 3 may be configured by hard plastic material.

Because such an ear phone can obtain an improved frequency characteristic, it is possible to provide a more natural acoustic feeling which conventional earphones can not realize. Further, this can be attained by only providing the ear piece 32 with the opening 34 and the resistant material 35.

Although the above description is made about the earphone for the left ear, it is needless to say that the earphone for the right ear can be also obtained symmetrically with the aforementioned earphone.

Having described a preferred embodiment of the invention with reference to the accompanying drawings, it is to be understood that the invention is not limited to the above precise embodiment and that various changes and modifications could be effected therein by one skilled in the art without departing from the spirit or scope of the invention as defined in the appended claims.

What is claimed is:

1. An earphone comprising:

an electroacoustic transducer for converting an electrical audio signal to an acoustic sound; and an ear piece disposed on a sound emanating side of said electroacoustic transducer for introducing said acoustic sound produced by said electroacoustic transducer to an external auditory meatus when the earphone is inserted into an ear of a user, said ear piece having a front surface facing said ear and including:

a first opening for opening an air chamber formed on the sound emanating side of said electroacoustic transducer to a surrounding environment and a ventilation resistant material disposed over said first opening, wherein said first opening formed on said front surface of said ear piece faces a cavum concha section of said ear when the earphone is inserted into said ear of said user, and a second opening formed on a protrusion of said front surface of said ear piece for introducing said acoustic sound to said external auditory meatus, wherein said protrusion of said front surface is surrounded by said external auditory meatus when the earphone is inserted into said ear of said user.

2. The earphone as claimed in claim 1, wherein said second opening is provided at a position substantially opposing said first opening with respect to a central portion of said ear piece.

3. The earphone as claimed in claim 2, wherein said ventilation resistant material is a nonwoven fabric.

4. The earphone as claimed in claim 2, wherein said ventilation resistant material is a urethane product.

5. The earphone as claimed in claim 3, wherein said ventilation resistant material is disposed over said first opening on an inside surface of said front surface of said ear piece.

* * * * *